United States Patent
Esposito et al.

(10) Patent No.: US 7,881,825 B2
(45) Date of Patent: Feb. 1, 2011

(54) PRODUCTION CONTROL UTILIZING REAL TIME OPTIMIZATION

(75) Inventors: William R. Esposito, Amherst, NY (US); Solomon Dadebo, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 954 days.

(21) Appl. No.: 11/729,226

(22) Filed: Mar. 28, 2007

(65) Prior Publication Data
US 2008/0243310 A1    Oct. 2, 2008

(51) Int. Cl.
G05B 21/00    (2006.01)
(52) U.S. Cl. .................. 700/268; 700/266; 429/129
(58) Field of Classification Search .......... 422/129; 700/266, 268
See application file for complete search history.

(56) References Cited

U.S. PATENT DOCUMENTS

| | | | |
|---|---|---|---|
| 4,208,712 A | 6/1980 | Deutsch | |
| 5,521,814 A | 5/1996 | Teran et al. | |
| 6,038,540 A | 3/2000 | Krist et al. | |
| 6,681,155 B1 | 1/2004 | Fujita et al. | |
| 6,731,994 B2 * | 5/2004 | Heching et al. | 700/95 |
| 6,731,998 B2 * | 5/2004 | Walser et al. | 700/99 |
| 6,816,822 B1 * | 11/2004 | Hess et al. | 703/2 |
| 6,836,689 B2 * | 12/2004 | Walser et al. | 700/100 |
| 6,993,396 B1 * | 1/2006 | Gerry | 700/36 |
| 7,024,265 B2 * | 4/2006 | Walser et al. | 700/100 |
| 7,092,893 B2 | 8/2006 | Megan et al. | |
| 2002/0017113 A1 | 2/2002 | Seiver et al. | |
| 2006/0184254 A1 | 8/2006 | Carpency et al. | |
| 2007/0245770 A1 | 10/2007 | Taha et al. | |

OTHER PUBLICATIONS

Rajesh et al., "Multi-objective optimization of industrial hydrogen plants", Chem. Eng. 56 (2001), pp. 999-1010.
Nandasana et al., "Dynamic Model of an Industrial Steam Reformer and Its Use for Multiobjective Optimization", Ind. Eng. Chem Res. 42 (2003) pp. 4028-4042.

* cited by examiner

Primary Examiner—Brian J Sines
(74) Attorney, Agent, or Firm—David M. Rosenblum

(57) ABSTRACT

Method of controlling production of a plant incorporating one or more chemical processes in which products are produced through consumption of raw materials. In accordance with the method, current production rates of the products are computed by semi-empirical process models that are corrected through error corrections of actual production rates to produce corrected models. The production is then optimized using the corrected models to maximize the variable margin gained upon the sale of the products. The optimization yields targets that either directly or at least influence consumption of the raw materials. The raw materials are then introduced into the process or processes in accordance with the targets.

3 Claims, 4 Drawing Sheets

PRODUCTION CONTROL UTILIZING REAL TIME OPTIMIZATION

FIELD OF THE INVENTION

The present invention relates to a method of controlling production of products produced by one or more chemical processes that consume raw materials in which targets for process parameters, that are controlled to control the processes, are set by real time optimization. More particularly, the present invention relates to such a method in which semi-empirical process models of the processes are used in the real time optimization.

BACKGROUND OF THE INVENTION

The setting of production targets for various types of production facilities has been effectuated with the use of real time optimization programs that utilize an optimization technology. Such programs or programming is used as a planning aid to determine the production output from the facilities that will optimize production on the basis of the cost of production and the selling price of the products to be produced.

For example, in U.S. Pat. No. 7,092,893, a method of controlling liquid and gaseous production within a number of air separation plants is provided in which gaseous and liquid products are produced and distributed to customers. In an air separation plant, air is separated by compressing the air, cooling the compressed air to a level at or near its dew point and then distilling the air in distillation columns to produce such gaseous products as oxygen and nitrogen and liquid products such as liquid oxygen. Hence, a central cost of production in air separation plants is the electrical power costs that are consumed in compressing the air in producing liquid products. The electrical power costs will vary from plant to plant and will in any case vary based upon the time of day that the electrical power is consumed. Additionally, road shipping costs present another variable that depends upon the location of the production facility and the customer. In order to maximize the profits and to meet customer demands, the particular producing plants are selected to minimize electrical power costs and road shipping costs.

A particularly complex optimization problem concerns the operation of facilities that employ chemical processes, for example, steam methane reforming to produce hydrogen containing products such as a synthesis gas or a further refined hydrogen product as well as export steam that can also be sold as a product. The raw materials that are consumed are natural gas, makeup water to generate the steam and depending upon the plant, electrical power.

The complexity of the optimization results from the number of unit operations that are being conducted in such a plant. For example, part of the natural gas and part of the steam is fed to a steam methane reformer that consumes the natural gas and steam in endothermic steam methane reforming reactions. A remaining part of the natural gas and combustion air are consumed within a radiant heat exchange zone of the steam methane reformer to generate the heat necessary to support the endothermic heating requirements of the steam methane reforming reactions. There is further a complicated network of heat exchangers that are used to generate steam from the makeup water. The resultant synthesis gas can then be sent to a water gas shift reactor to increase the hydrogen content of the synthesis gas and then to a pressure swing adsorption unit to separate the hydrogen into the hydrogen product. A hydrogen containing stream produced from the cryogenic rectification process can be combined with that produced from the water gas shift reactor for separation within the pressure swing adsorption system and the production of the hydrogen product.

Such hydrogen producing plants are directly controlled by setting targets for a control system that in turn controls the process parameters that are relevant to the particular unit operation involved. For example, changing the steam to carbon ratio of the reactants fed to the steam methane reforming process will change the hydrogen content in the synthesis gas. Also, the amount of the synthesis gas sent to the water gas shift reactor will also effect the amount of hydrogen and carbon monoxide to be recovered as products. Typically, the controller can utilize model predictive control techniques to set the control targets to obtain a particular desired plant performance, for example, to produce a specific amount of hydrogen.

In any chemical plant or other production facility, it is desirable to set production targets to obtain the maximum profitability or margin based upon the selling price of the products and the costs of production, for example, electrical power, natural gas and water costs in case of a hydrogen plant. Complicating any calculation of the production products of the products being offered for sale is that the demand for such products will vary resulting in a variable profitability or margin. Contributing to such variability is that the costs of the raw materials can vary. Additionally, many of such production facilities can employ similar processes that produce the same intermediate products, for example, several steam methane reformers that are of different design or capability.

It would therefore appear that the setting of such production targets as inputs to the control system would be amenable to real time optimization techniques that can handle many variables and arrive at an optimization that individually considers movement of each variable. As stated previously, the use of such real time optimization techniques has found applicability as a planning tool. This is due to the fact that models used for the unit operations that calculate process outputs such as the products produced by chemical reactions of raw materials are themselves complex and take a sufficiently long time to converge. As a result the real time optimization cannot be practically utilized for purposes of setting targets for control of the plant. For example, a model of a steam methane reformer typically will model the heat transfer within the radiant section along the length of each of the reformer tubes and will calculate the chemical reaction along the length of the reformer tubes. Such a model can take an hour or more of computational time. A model predictive control system, however, updates targets every minute.

As will be discussed, the present invention provides a method of controlling the plant operations in which variable margin is optimized by real time optimization techniques that utilize semi-empirical process models in connection with such techniques that make practical the setting of target for control of a plant by real time optimization.

SUMMARY OF THE INVENTION

The present invention provides a method of controlling the operation of a plant that produces products through processes, including a chemical reaction process, to optimize production of products produced by the plant in response to a variable demand.

In accordance with the method, predicted current production rates of products and predicted consumption rates of raw materials used in the production of the products are determined. These production rates and the consumption rates are determined with the use of models that include semi-empirical process models operating on the basis of mass balances, energy balances and pressure balances and including adjustable modeling parameters that influence predicted current production rates and predicted consumption rates.

At least one of the semi-empirical process models contain a chemical process model of at least one chemical reaction. The mass balances for the chemical process model are a function of the mass balances of each of the chemical species taking part in the at least one chemical reaction. The mass balances are based upon an extent of reaction of the at least one chemical reaction and at least one equilibrium expression derived from an outlet pressure of the reactor and at least one equilibrium constant. The at least one equilibrium constant is in turn a function the difference between the outlet temperature and an approach to at least one equilibrium temperature. The adjustable modeling parameters for the chemical process model comprise the approach to the at least one equilibrium temperature and an assumed pressure drop within the reactor.

Errors are determined between the predicted current production rates and actual current production rates and the errors are applied to the semi-empirical process models by adjusting the adjustable modeling parameters such that the predicted and actual current production rates are about equal and therefore, the semi-empirical process models become corrected semi-empirical process models.

Production of the products is optimized through real time optimization utilizing the corrected semi-empirical process models to yield targets for process parameters that at least influence the production of the products and the consumption rates of the raw materials. The optimization is conducted on a basis of cost of the raw materials and selling price of the products and the production being optimized such that the variable demand is met and such that a variable margin gained upon sale of the products is maximized. The processes conducted within the plant are controlled in accordance with the targets.

The products can include a hydrogen containing product and export steam. In such case the processes include steam methane reforming conducted within a steam methane reformer to produce a synthesis gas containing hydrogen for the hydrogen containing product and indirect heat exchange conducted within heat exchangers to produce steam to be consumed in the steam methane reformer and export steam made up of steam not consumed by the steam methane reformer. The raw materials comprise a hydrocarbon containing stream and water used in production of the hydrogen containing product and the export steam. The semi-empirical process models include a steam methane reformer model and heat exchanger models.

The steam methane reformer model has a process side and a furnace side. The furnace side incorporates the chemical process model to model production of the synthesis gas stream. The at least one chemical reaction therefore comprises chemical reactions occurring within the steam methane reformer that include an endothermic reaction of the steam and hydrocarbons composed of part of the hydrocarbon containing stream. The furnace side models production of a heated flue gas and heat to support the endothermic reaction by combustion of an air stream and a fuel composed at least in part of a remaining part of the hydrocarbon containing stream. This is modeled on the basis of a completion of the reaction between the air stream and the fuel and without an assumed pressure drop.

The heat exchanger models model heat exchange operations between the heated flue gas and the synthesis gas. The adjustable process parameters also include an assumed loss of the heat from the steam methane reformer, heat transfer coefficients between the process side and the furnace side of the steam methane reformer model and within the heat exchangers. The targets for the process parameters also include a steam to carbon ratio of the steam methane reforming reactions, synthesis gas temperature of the synthesis gas and combustion air flow of the air.

Although the hydrogen containing product can constitute the synthesis gas, it can also be a purified hydrogen stream produced by subjecting the synthesis gas stream to a water gas shift reaction to produce a shifted stream and a pressure swing adsorption process to produce the purified hydrogen stream and a waste fuel stream. In such case, the fuel is also composed of the waste fuel stream and the chemical process model employed in the process side of the steam methane reformer model is one of two chemical process models. The other of the two chemical process models is a water gas shift reactor model to model the production of the shifted stream through reaction of carbon monoxide and water contained in the synthesis gas stream.

Where the product is the purified hydrogen stream, the models also include a splitter model of the pressure swing adsorption process utilizing a percentile of hydrogen separation from the shifted stream, the percentile varying with flow rate of the shifted stream. The assumed heat losses of the adjustable process parameters also include a loss of heat from the water gas shift reactor. The heat exchanger models also model the indirect heat exchange within a feed gas heater and a feed water heater between the hydrocarbon containing stream and the water, respectively, and the shifted gas stream.

As can be appreciated from the above discussion, the bottleneck involved in applying real time optimization to set control parameters of a plant employing a chemical process is overcome by modeling the chemical process in a simplified form that can be solved in the time allotted for execution of the control system.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

DETAILED DESCRIPTION

Figure 1:
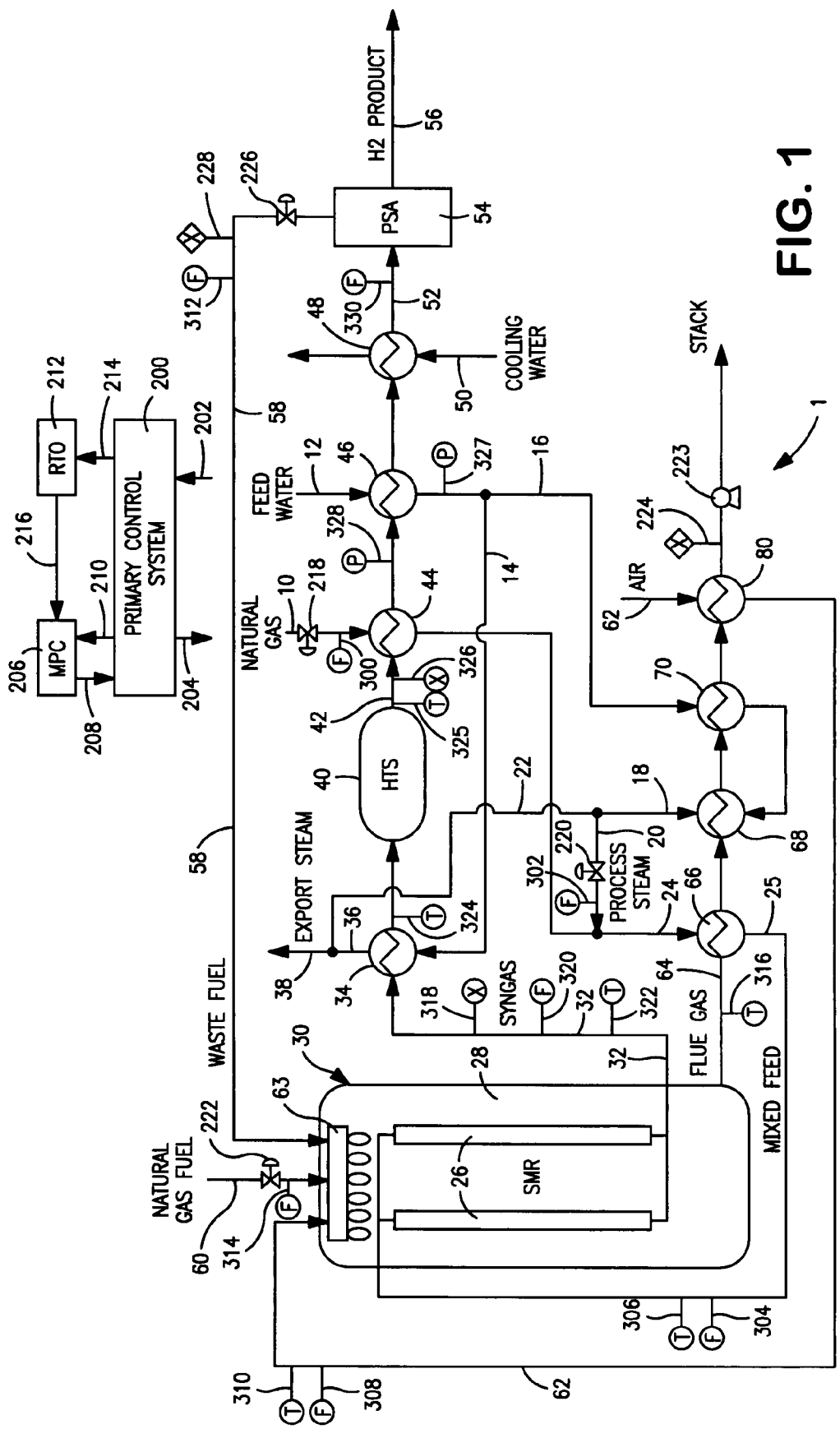
FIG. 1 is a schematic illustration of a hydrogen plant controlled by a method in accordance with the present invention.

With reference to FIG. 1, a hydrogen plant 1 is illustrated that is controlled in accordance with the present invention. It is understood this is for purposes of illustration as the present invention is not limited to a particular type of production facility, but rather has application to any facility in which one or more chemical reactions is carried out that uses an equilibrium expression for modeling purposes. For example, the present invention has application to a methanol plant.

In hydrogen plant 1, a natural gas stream 10 is preheated in a heat exchanger 44 that serves to cool a shifted gas stream 42 from a water gas shift reactor ("HTS") 40. As would be understood by those skilled in the art, natural gas stream 10 would be pretreated by addition of some of the hydrogen product to a hydrotreater to convert the sulfur species present in the natural gas to hydrogen sulfide that would be removed by an adsorbent bed containing zinc oxide. At the same time, a feed water stream 12 is also preheated in a heat exchanger 46 to further cool shifted gas stream 42. Feed water stream 12 is then divided into first and second subsidiary feed water streams 14 and 16. Second subsidiary feed water stream 16 is further heated in a heat exchanger 70 connected with the convective section of steam methane reformer 30 and is yet, again further heated to form a saturated steam stream 18 within heat exchanger 68 that also is associated with the convective section of steam methane reformer 30. Saturated steam stream 18 is divided into a process steam stream 20 and a remaining superheated steam stream 22.

Process steam stream 20 is combined with natural gas stream 10 to form a mixed feed stream 24 that is heated within heat exchanger 66 also associated with the convective section of steam methane reformer 30. The heated mixed feed stream 25 is then introduced into reformer tubes 26 contained in a radiant heat exchange section 28 of steam methane reformer 30. Reformer tubes 26 are filled with catalyst, usually composed of nickel compounds. The catalyst promotes the conversion of the natural gas-steam mixture to a hydrogen and carbon monoxide containing gas known in the art as synthesis gas. Gas temperatures within the steam methane reformer range from about 900° F. to about 1700° F.

The synthesis gas exits steam methane reformer 30 as a synthesis gas stream 32. Synthesis gas stream 32 is cooled in heat exchanger 34 against second subsidiary feed water stream 14 to produce a further saturated steam stream 36 that is combined with superheated steam stream 22 to produce export steam stream 38. Export steam stream 38 can be sold to a facility at which hydrogen plant 1 is located and as such constitutes a product stream. The demand for such product stream is elastic in that as much as can be produced can be sold.

It is to be noted that synthesis gas stream 32 could be the product that is sold that would have a variable demand. However, as will be discussed, in the exemplary embodiment hydrogen is the end product for sale. In this regard, synthesis gas stream 32 after passage through heat exchanger 34 is at a temperature suitable for conducting a water gas shift reaction within water gas shift reactor 40 where carbon monoxide and steam are reacted to produce more hydrogen. The shift conversion reaction is slightly exothermic and such units normally operate at temperatures ranging from about 400° F. to about 900° F. The shifted stream 42, leaving the water gas shift reactor 40 can have a temperature of up to about 800° F. and is introduced into heat exchanger 44 to preheat the natural gas stream 10, then to heat exchanger 46 to preheat feed water stream 12. Shifted stream 42 is then further cooled in a water-cooled heat exchanger 48 fed with a cooling water stream 50 to produce a crude hydrogen stream 52. Not shown in the drawing are various knock-out drums used to remove condensed water.

Crude hydrogen stream 52 is introduced into a pressure swing adsorption unit 54. The pressure swing adsorption unit 54 produces a hydrogen product stream 56 at purities ranging from about 99% to about 99.999% based on the system design. The hydrogen recovery can typically range from about 75% to about 95%. The hydrogen product stream 56 constitutes another product produced by hydrogen plant 1 for sale to the facility and outside the facility. The demand for such product is variable. For example, when the hydrogen plant is located in a refinery, the hydrogen product stream 56 can be sold both within the refinery and elsewhere in accordance with the demand therefore.

The unrecovered hydrogen and any carbon monoxide, methane, water vapor, and nitrogen present in crude hydrogen stream 52 are purged from the pressure swing adsorption unit as tail gas or waste fuel stream 58. Waste fuel stream 58 is used in connection with a natural gas fuel stream 60 that constitutes part of the natural gas consumed by hydrogen plant 1; the other part of the natural gas being used as a reactant by way of natural gas stream 10. The fuel is combusted within a burner system 63 firing into the radiant heat exchange zone 28 of steam methane reformer 30 to supply heat to support the endothermic steam methane reforming reactions occurring within steam methane reformer tubes 26. The combustion of such fuel is supported by air which as an air stream 62 is preheated in a heat exchanger 80 and fed to the burner system 63.

The combustion produces a flue gas stream 64 that is discharged from radiant heat exchange zone 28, at temperatures ranging from about 1600° F. to about 2000° F. and enters the convection section of steam methane reformer 30 where the contained sensible heat is used to preheat the mixed feed as well as produce and to superheat steam. For such purposes, flue gas stream 64 passes sequentially through heat exchanger 66 to heat the mixed feed stream 24, heat exchanger 68 to superheat second subsidiary steam stream 16, heat exchanger 70 to heat second subsidiary boiler feed water stream 16, and heat exchanger 80 to preheat air stream 62. The resultant cooled flue gas stream 64 is then discharged to a flue stack where it is vented to the atmosphere, normally at temperatures in excess of about 260° F.

In any such plant, there are plant operational parameters that will at least influence the consumption of the raw materials and the rate at which products will be produced and hence, the margin or profit. This margin or profit can be a variable margin in that the demand for the products can change as well as the cost of the raw materials, for example, natural gas. As to the operational parameters, the following can be adjusted: steam to carbon ratio, through adjusting the flows of natural gas stream 10 and process steam stream 20; temperature of synthesis gas stream 32 exiting steam methane reformer 30 and the flow rate of combustion air 62. The oxygen concentration in flue gas stream 64 is a known constraint on the adjustment of the operation parameters.

Increasing the steam to carbon ratio will increase the production of hydrogen, reduce the production of export steam stream 38 as more steam will be used in the reforming reactions, increase natural gas used for fuel in fuel stream 60 and decrease excess oxygen in the flue gas stream 64. Increasing the flow rate of the natural gas stream 10 will increase the production of hydrogen, increase the amount of natural gas fuel stream 60 and decrease the excess oxygen in the flue gas stream 64. A decrease in such flow rate will have the opposite effect. As to the temperature of the synthesis gas stream 32, an increase in temperature will increase the hydrogen production rate in that there is a higher overall methane conversion, increase the export steam stream 38 available for sale, increase natural gas fuel stream 60 and decrease in the excess oxygen in the flue gas stream 64. A decrease will have the opposite effect. Increasing the flow rate of the combustion air stream 62 will increase the export steam stream 38 available for sale, increase natural gas fuel stream 60 and increase excess oxygen in the flue gas stream 64. Decreases in any of these quantities will have direct opposite effects.

Pertinent control features for hydrogen plant 1 that are necessary to control operational aspects of the plant, such as are discussed above, are controlled by a control system that incorporates real time optimization to optimize the variable margin by optimizing the consumption of the raw materials and the production of the products for sale. The raw materials of hydrogen plant are the feed water stream 12, the natural gas stream 10, the natural gas fuel stream 60, electricity for a draft fan 223 to control the flow of combustion air stream 62 and feed water stream 12. In an embodiment of the present invention the electricity consumed by the draft fan 223 and the feed water stream 12 could be neglected. The products are the hydrogen product stream 60 and the export steam stream 38.

Turning to the control system, the hydrogen plant 1 is controlled by a primary control system 200 that receives data on flow rates of the various streams, generally designated by arrowhead 202 and that generates control signals, generally designated by arrowhead 204, to control the flows in the plant as well as temperatures, pressures and concentration of various streams. Not shown in this illustration for purposes of simplicity are the electrical connections between primary control system 200 and the remotely activated control valves and various sensors such as flowmeters, gas chromatographs, pressure transducers and temperature transducers. Set points for lower level proportional integral differential controller that operationally control the plant, for example, flow rates of the feed water stream 12, the natural gas stream 10, the natural gas fuel stream 60 and oxygen concentration of the flue gas stream 64 are controlled by a model predictive controller 206 that are fed as data, generally indicated by arrowhead 208, into primary control system 200. The model predictive controller 206 is reactive to flows and etc. that are fed as an input 210 into model predictive controller 206 from the primary control system 200. As well known in the art, in model predictive control, unit step response models are utilized to predict an open loop response and necessary control actions to minimize the difference between a predicted response and the targets for the operational parameters that in turn control the production of the products and consumption of the raw materials.

The targets for the operational parameters, for example, the steam to carbon ratio, that are used by the model predictive controller 206 in setting the set point discussed above, are generated by a real time optimization program 212 in accordance with the present invention. Real time optimization program 212 receives data 214 from the primary control system 200 and that constitutes some of the data 202 and then generates targets 216 that are fed as an input to model predictive controller 206.

As indicated above, a target for the process parameter of the steam to carbon ratio is set by the real time optimization program 210 by setting both a target for the steam to carbon ratio and a target for the flow of natural gas stream 10. The model predictive control system 206, then sets a set point for process steam stream 20 to in turn control the steam to carbon ratio. For such control purposes, a valve 218 is provided to control the flow of natural gas stream 10 and a valve 220 is used to control the flow of the process steam stream 20. For example, increasing the flow of steam stream 20 will increase such ratio. The actual control for valves 218 and 220, as well as other valves is by proportional differential control provided by the primary control system 200 that in turn produces the control signals 204 to operate the valves. Another possible control mentioned above is to increase or decrease the flow of natural gas stream 10 by way of valve 218.

The outlet temperature of steam methane reformer 30, another target, for the process parameters, is controlled by controlling the temperature of the synthesis gas stream 32. The point of control is the flow rate of natural gas fuel stream 60 by way of a valve 222. Allied with such control is the control of combustion air stream 62. This is done by controlling the opening of louvers associated with a known draft fan 223 in the convective section of the steam methane reformer 30 by control signal 204. These points of control are "allied" or at least related by a constraint of the oxygen level in the flue gas stream 64. This is sensed by an oxygen concentration sensor 224 that is fed as part of the input 202 into the primary control system, as part of the input 210 into the model predictive controller 216 and as part of the input 214 into the real time optimization program. The pressure of waste fuel stream 58 is also controlled by a control valve 226 and its composition is sensed by a gas chromatograph 228. All of these control points for hydrogen plant 1 are conventional and well known in the art.

As will be discussed in detail, the real time optimization contemplated by the present invention and indicated as real time optimization program 212 allows targets for controlled process parameters to be set in a manner in which variable margin gained upon the sale of the products of hydrogen plant 1, namely, export steam and hydrogen will be optimized. It is termed "variable" in that costs and sales prices can vary over time. The calculation is done on a unit time basis since all of the flows of the products and raw materials are being measured that way. In the end, the determination of the real time optimization program is that of the variable margin on a dollar per unit time basis.

One of the key features of the present invention are process models, for example, a process model of the steam methane reforming reaction occurring within steam methane reformer 30. These process models are used to predict the interactions between the optimization variables and the constraints and objective function. These process models are key in that they allow the integration of the real time optimization program 212 with the model predictive control system 206 or other less advanced control system. In this regard, the present invention contemplates real time optimization used in conjunction with manual control and implementation and as such as a planning tool. However, in order to allow any practical implementation of a real time process optimization process or program, modeling must be done to allow for the execution of the program in a practical amount of time for changes to the operation of the plant to be effected.

In accordance with the present invention, the process models used can be said to be formulated on the basis of a semi-rigorous approach in that they are detailed enough to capture the major non-linear interactions in the system, but can still be solved in a reasonable amount of time thus allowing optimization to take place at a reasonable pace. For example, fully rigorous models of the steam methane reformer 30 that would consider such second order effects as the temperature distribution along reformer tubes 26 would take over an hour of computational time and thus, not be useful in interacting with the control system of plant 1, namely the primary control system 200 and the model predictive controller 206. In addition to the models used, adjustable parameters are incorporated into the process models to enable models to be updated to better match plant data. By using this semi-rigorous approach with model updating, the hydrogen plant 1 is able to be optimized more frequently and to respond faster to changes in customer demands and economics then one would expect from a standard utility plant optimizer. The models are limited by a number of constraints that include: limits on the optimization of the variables, physical equipment limitations (i.e. power usage, valve positions, etc.), customer demand constraints and reality limits (i.e. flows, compositions, etc. must be positive) which can also be captured.

Figure 2:
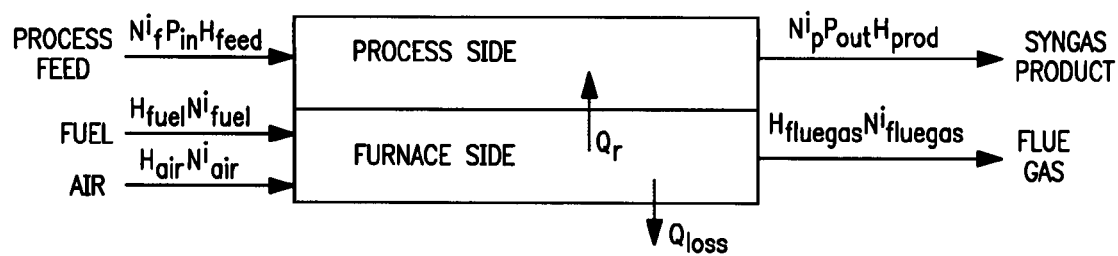
FIG. 2 is a schematic illustration of a semi-empirical model of a steam methane reforming process in accordance with the present invention.

With reference to FIG. 2, the process models utilized in the steam methane reformer 30 are illustrated. These process models are models of the chemical processes occurring within the radiant heat exchange section 28 of steam methane reformer 20 and as such has a process side to model the chemical process occurring within reformer tubes 26 or in other words the steam methane reforming reaction. The furnace side models the combustion reaction between the fuel provided by the natural gas fuel stream 60 and the waste fuel stream 58 and air provided by combustion air stream 62. The system is modeled as two lumped reaction systems (i.e. no spatial gradients) with heat being transferred between the two systems. The steam-methane reforming reaction system can be described by the following two reactions:

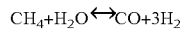

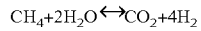

In the model shown in FIG. 2, equilibrium expressions are used to describe the reactions as opposed to a fully dynamic model. The model utilizes simultaneous equations of mass balance, pressure balance and energy balance that are solved by an iterative approach. The three equations are as follows:

$N^i_p = N^i_f + \Sigma V_{in} \epsilon_j$ (Mass Balance)

$P_{out} = P_{in} + \Delta P$ (Pressure Balance)

$0 = H_f - H_{prod} - \Delta H_r + Q_r$ (Energy Balance)

In these equations, N is the number of moles, V is a stoichiometric coefficient, ε are the extent of reactions calculated from the equilibrium expressions, P is the pressure, ΔP is an assumed pressure drop, $\Delta H_r$ is the heat of reaction and $Q_r$ is the heat transmitted from the furnace side of the model.

As a first step, the composition of natural gas reactant feed stream 10 is determined. This determination can be obtained from the utility supplying the natural gas or from a gas chromatograph sampling port provided for such purpose. The flow rate of the natural gas reactant feed stream 10 is then measured by flowmeter 300 and the flow rate of the process steam stream 20 is measured by flowmeter 302. This sets the number of moles of each component of the reaction occurring on the process side that is given in the model as $N^i_f$. The pressure of the mixed feed stream 25 is measured by a pressure transducer 304 to set $P_{in}$. The temperature of the mixed feed stream 25 is also measured by a temperature transducer 306. At this point, the temperature, pressure and composition of the mixed feed stream 25 is known and as such, the enthalpy $H_{in}$ can be calculated from an equation of state thermodynamic model based upon experimental data and very well known in the art. Numerous examples and sources of such models exist. There also exists a control temperature at the outlet of the process side or the reformer tubes 26 that is a control target obtained from the model predictive control system 206. The equilibrium constants are a strict function of temperature and are set equal to values obtained at an approach to equilibrium temperature. Equilibrium expressions are defined for each of the reaction equations and are based upon the partial pressure of each component in the synthesis gas stream 64. The partial pressure for each component is equal to $P_{out}$, known from the pressure balance, times a quotient of the number of moles of each component divided by the total number of moles of the product. This is done for each equation of the chemical reaction, for example $CH_4 + H_2O \leftrightarrow CO + 3H_2$. The unknown is $\epsilon_j$. The mass balance and equilibrium expressions are solved for ε and from this, $N^i_p$ for each component are known.

The next equation is the energy balance. Since the composition of the product is known from $N^i_p$, the control temperature is set and the $P_{out}$ is known, the $H_{product}$ can be determined in the same manner as the $H_{feed}$. The heat of reaction is also known in that $\Delta H_r$ is equal to the flow of the product, given the total number of moles of each constituent of the product is known, multiplied by the heat of formation of the product less the number of moles of the feed less the heat of formation of the feed. From this $Q_r$ is known.

The furnace side model is solved for $Q_r$ in a similar manner to that of the process side model to obtain a value of $Q_r$ that is equal to that determined in the process side model. The equations that govern this model are as follows:

$Q_r = UA \Delta T_{ln}$ $Q_r = H_{air} + H_{fuel} - H_{fluegas} - H \Delta_{combustion} - Q_{loss}$ $N^i_p = N^i_f + \Sigma V_{in} \epsilon_j$ In the equations "U" is an assumed heat transfer coefficient, "A" is the area of heat transfer and $\Delta T_{ln}$, is the log mean temperature difference. The enthalpies are the enthalpy of air "$H_{air}$", the enthalpy of the fuel "$H_{fuel}$", the enthalpy of the flue gas "$H_{fluegas}$", the heat of combustion "$\Delta H_{combustion}$" and assumed heat loss, "$Q_{loss}$". The third equation is the mass balance equation discussed above with respect to the process side model with the components of the reaction being the fuel and air.

In solving this model, the flow rate and temperature of combustion air stream 62 is measured by a flow meter 308 and temperature sensor 310 upon its entry into combustion system 63. The air is assumed to be at atmospheric pressure. Also measured is the flow rate of waste fuel stream 58 by flow meter 312 along with its composition by gas chromatograph 228. The composition of natural gas fuel stream 60 is the same as that of natural gas reactant fuel stream 10 and is determined in a like manner. The flow rate of the natural gas fuel stream 60 is also measured by a flow meter 314. Both the natural gas fuel stream 60 and the waste fuel stream 58 are assumed to have ambient temperature. Since the reactions are assumed to go to completion, "$\epsilon_j$" in the mass balance is also known.

An initial guess for the fuel flow of the natural gas fuel stream 10 is made by initially using the current value of the fuel flow as determined by flowmeter 314 and subsequent calculated values derived from the process models and from previous calculations and then based upon the equation of mass balance, an estimate of the flue gas composition can be made. The enthalpies are calculated on the assumption that the temperature is the furnace temperature for such calculation and the same is sensed by sensing the temperature of the flue gas stream 64 by a temperature transducer 316. From the $Q_r$ determined from the process side model, the mean temperature difference "$\Delta T_{ln}$" can be determined. The heat of combustion "$\Delta H_{combustion}$" can then be calculated and $Q_{loss}$ is assumed. The energy balance error can then be determined from the energy balance equation. The flow rate of natural gas fuel stream 60 can then be adjusted until the error is essentially zero.

The model is then adjusted. In order to do this the composition of synthesis gas stream 64 is measured by a gas chromatograph 318. This value is compared to the predicted value to obtain an error. The approach temperature in the model is then adjusted of each reaction and then the model is resolved to minimize the least squared error. On the furnace side, the temperature of flue gas stream 64 is measured by temperature transducer 316 and the flow rate of natural gas fuel stream 60 is measured by a flow meter 314. The heat transfer coefficient and $Q_{loss}$ are then adjusted so that a minimum error on the measurement of the temperature of the flue gas stream 64 versus the prediction and the flow rate of the natural gas fuel stream 60 is obtained versus the calculated value. The foregoing models are then corrected models that can be used in the real time optimization calculations.

The water gas shift reactor 40 is modeled in the same way as the process side of the reformer with the exception of the heat balance. The relevant equation for the water gas shift reaction is as follows:

$$CO + H_2O \leftrightarrow CO_2 + H_2$$

Since the shift reaction is exothermic there is no need to transfer any heat to the process for the reaction to occur. Therefore the unit is normally run adiabatically and the only heat transferred to/from the process is heat that is lost to the atmosphere. The same forms of the mass balance and pressure drop equations that were used for the reformer is used here. The energy balance now takes the form:

$$0 = H_{feed} - H_{prod} - \Delta H_r - Q_{lost}$$

The term $Q_{lost}$ in the above balance can be determined using the difference between the temperature in the reactor and the ambient temperature. In this regard, a temperature transducer (measured by temperature of shifted stream 42) to determine reactor temperature and ambient temperature is sensed by an ambient temperature transducer now shown is used for such purpose. Once again a set of simultaneous non-linear equations is generated to determine the composition and temperature of the exit stream given the fully qualified (flow, temp, pressure, composition) inlet stream.

The composition of the synthesis gas stream 32 is known from gas chromatograph 318. The flow rate of such stream is measured from flowmeter 320. This sets the number of moles of each component of the reaction occurring within water gas shift reactor 40 that is set forth as $N^i_p$. Additionally, the pressure of the synthesis gas stream 32 is also measured by a pressure transducer 322. The temperature of the synthesis gas stream as it enters water gas shift reactor 40 is measured by a temperature transducer 324. Since the temperature, pressure and composition of the synthesis gas stream 32 is known, the enthalpy $H_{in}$ can be calculated from an equation of state thermodynamic model, well known in the art. The temperature of the shifted stream 42 is derived from temperature transducer 325. The equilibrium constants are set equal to values obtained at an approach to equilibrium temperature and equilibrium expressions are defined for each of the equations that are based upon the partial pressure of each component in the shifted stream 42. The partial pressure for each component is again based upon $P_{out}$, known from the pressure balance, the number of moles of each component divided by the number of moles of the product. The unknown is $\epsilon_j$. The mass balance and equilibrium expressions are solved for e and from this, $N^i_p$ for each component are known.

The model is then adjusted. In order to do this the composition of shifted stream 42 is measured by a gas chromatograph 326. This value is compared to the predicted value to obtain an error. The approach temperature in the model is then adjusted of each reaction and then the model is resolved to minimize the least squared error.

The pressure swing adsorption unit 54 is designed to separate all of the impurities from the crude hydrogen feed stream 52 to generate the product hydrogen stream 56 and the waste fuel stream 58 which is returned to the burner unit 63 as part of the fuel. A pressure swing adsorption system is a very complex unit with cyclic steady state operation. A detailed model would require a significant number of dynamic equations and an extremely long solution time. Therefore, the approach taken is preferably to simply model the unit as a mass splitter in which the hydrogen product stream 56 is assumed to be pure and calculated from a simple recovery expression:

$$F_{H2} = Rec_{H2} * F_{in} * x^{in}_{H2}$$

where $F_{H2}$ is the flow of product hydrogen, $F_{in}$ is the inlet flow rate, $x^{in}_{H2}$ is the composition of $H_2$ in the crude hydrogen stream 52, and $Rec_{H2}$ is the recovery of hydrogen in the pressure swing adsorption unit 54 that constitutes the adjustable parameter for correcting this particular. The recovery of hydrogen in the pressure swing adsorption unit 54 can be determined either as a fixed value or a function of any of the conditions of the inlet stream. The flow and composition of the waste stream is then determined by whatever remains. For example, $Rec_{H2}$ is adjusted as a quadratic function of the flow of crude hydrogen stream 52 that can be set forth as A+B*Flow+C*Flow^2 where A,B,C are predetermined constants based on plant data and the flow would be measured by a flowmeter 330.

Figure 3:
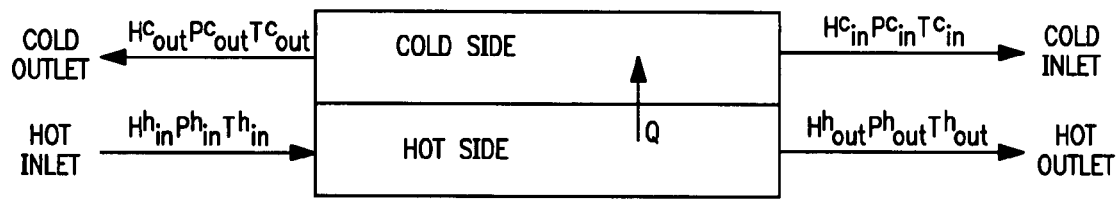
FIG. 3 is a schematic illustration of a semi-empirical model heat exchange process in accordance with the present invention.

The heat exchangers for heat recovery, for example heat exchangers 66, 68, 70 and 80 as well as the heat exchangers 34, 44, 46, and 48 associated with the water gas shift reactor 40 are modeled by a simple energy balance with a pressure drop expression for each side. FIG. 3 shows the generic exchanger used to develop the model. The equations used to describe this model are:

$$H^c_{in} - H^c_{out} = (H^h_{in} - H^h_{out}) = U * A * \Delta T_{ln}$$

$$P^c_{out} = P^c_{in} - \Delta P^c$$

$$P^h_{out} = P^h_{in} - \Delta P^h$$

where H is the enthalpy of the cold (c) or hot (h) inlet (in) and outlet (out) streams. U is the heat transfer coefficient (the adjustable parameter), A is the area for heat exchange, $\Delta T_{ln}$ is the log mean temperature difference between the two streams, P is the pressure of the cold (c) or hot (h) inlet (in) and outlet (out) streams and $\Delta P$ is the pressure drop on the cold (c) or hot (h) side that constitute further adjustable parameters in the model. These represent a set of simultaneous non-linear equations for each heat exchanger unit which can then be solved using any standard algorithm and linked together to form the entire heat recovery section.

For example, the solution of the process model for heat exchanger 44 would proceed as follows. The flow of natural gas stream 10 is known by virtue of flowmeter 300. Additionally, the composition of natural gas stream 10 is also known. The temperature is assumed to be ambient. The pressure can be measured by a pressure transducer or such pressure can be provided from the utility supplying the natural gas. Using these values the enthalpy of natural gas stream, namely $H^c_{in}$ is determined from a known thermodynamic model. The flow, composition, pressure and temperature of shifted stream 42 is also known through the measurements outlined above and its enthalpy $H^h_{in}$ can also be calculated from the thermodynamic model. The pressure of natural gas stream 10 and shifted stream 42 are then measured upon their exit from heat exchanger 44 by pressure transducers 327 and 328, respectively. The flows and compositions of these streams upon their exit from heat exchanger 44 are assumed to be unchanged by their passage through the heat exchanger 44. The final two unknowns are the temperatures of the natural gas stream 10 and the shifted stream 42 upon their discharge from heat exchanger 44 that are determined by simultaneously solving the non-linear energy balance equations for the model. As can be appreciated, heat exchangers 34, 46, 48, 66, 68, 70, 80 would be modeled in the same fashion with appropriate temperature and pressure transducers and gas chromatographs provided as necessary to quantify the characteristics of the streams.

In general the real time optimization system consists of three separate calculation procedures (or processes) all of which are run in parallel. The first runs the process models at current conditions, predicts various outputs, and compares those values to the plant data, for example, the actual composition, temperature, pressure and flow rates of the streams discussed above that are computed by the models (the "base model"). The second process uses current plant data to update various parameters in the model ("parameter updating"). The final process takes those updated parameters with current plant and economic information and determines the optimal values for the targets of the process parameters, for example, steam to carbon ratio, the temperature of the synthesis gas stream 32 and the flow rate of combustion air 62 (the "optimization process"). The logical sequence of this and the process models, such as have been discussed above, are a matter of routine programming techniques that can be effected in a real time optimization program such as AMS SUITE: REAL TIME OPTIMIZER software obtained from Emerson Process Management of 12603 SW Freeway, Suite 100 Stafford, Tex. 77477, United States of America.

Figure 4:
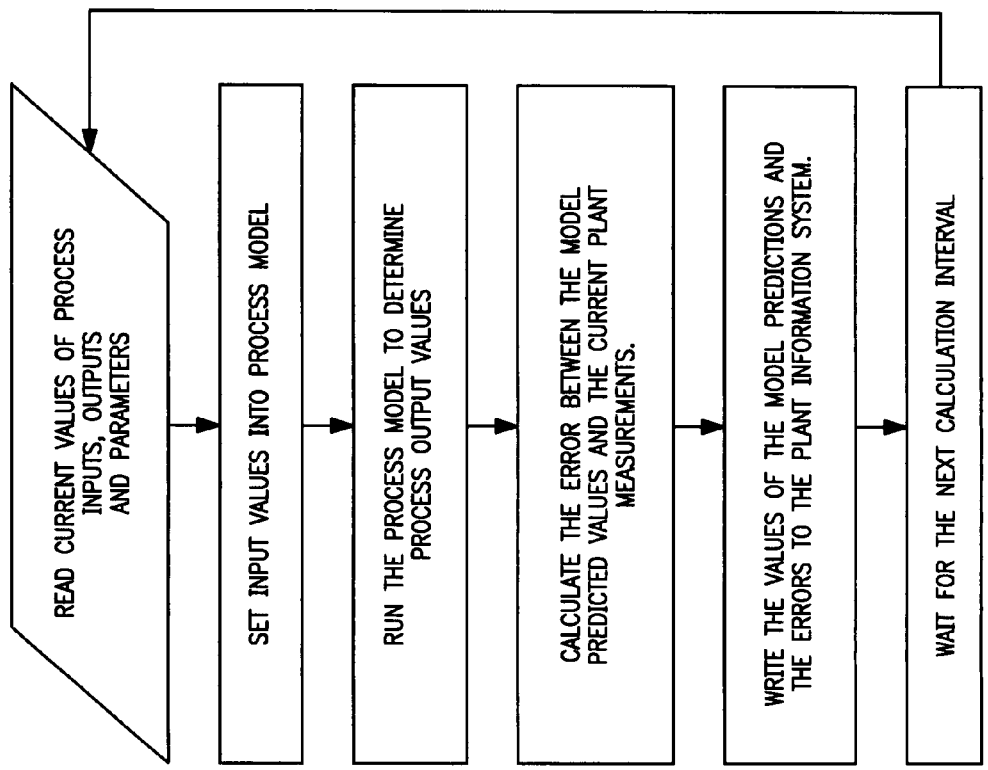
FIG. 4 is a logic diagram of the programming utilized to determine a base model in which predicted values of process outputs are calculated with the use of process models and errors are obtained between the predicted values and the current actual values of the process outputs.
Figure 6:
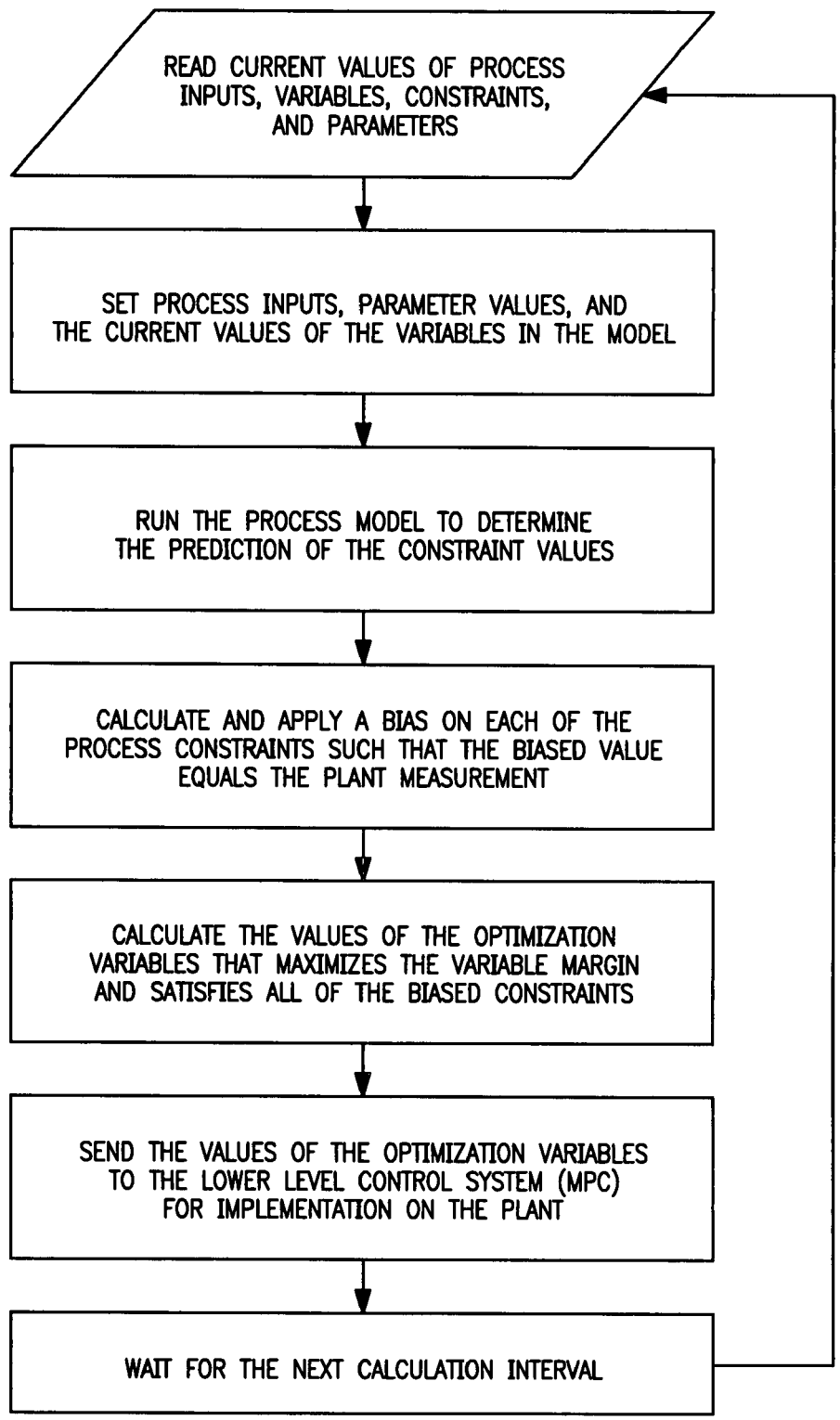
FIG. 6 is a logic diagram of the real time optimization process conducted in accordance with the present invention.

In the base model process, the validity of the site model is determined by comparing the output of the models with the true process characteristics. With reference to FIG. 4, the steps involved in this calculation begin with reading the current values for process inputs and outputs from the plant information system into the real time optimization system 212. For example, for the steam methane reformer model, the process inputs would be natural gas composition, the flow rate of natural gas stream 10, the temperature and pressure of the mixed feed stream 25, the temperature and flow of the air stream 62, the flow and composition of waste fuel stream 58 and the temperature of flue gas stream 64 to solve the model in the manner outlined above. In the illustration, this would be the data generally indicated by arrowhead 214. This data includes the current values of the updated adjustable parameters that were determined from a previous run, for example, the approach to equilibrium temperature. The process outputs from this steam methane reformer model would be the pressure, temperature and composition of the synthesis gas stream 32 and the flow of the natural gas fuel stream 60. The input values are then set into the process models and the process models are then run to determine the process output values. An error is then calculated between the model predicted values and the current plant measurements and the values of the model predication and the error are then written into the plant information system which can be a FOXBORO I/A series Distributed Control System obtained from the FOXBORO business unit of Invensys Process Systems of 33 Commercial Street, Foxboro, Mass. 02035, United States of America. This process is repeated from the initial data reading step at a predefined interval, generally less than two minutes.

Figure 5:
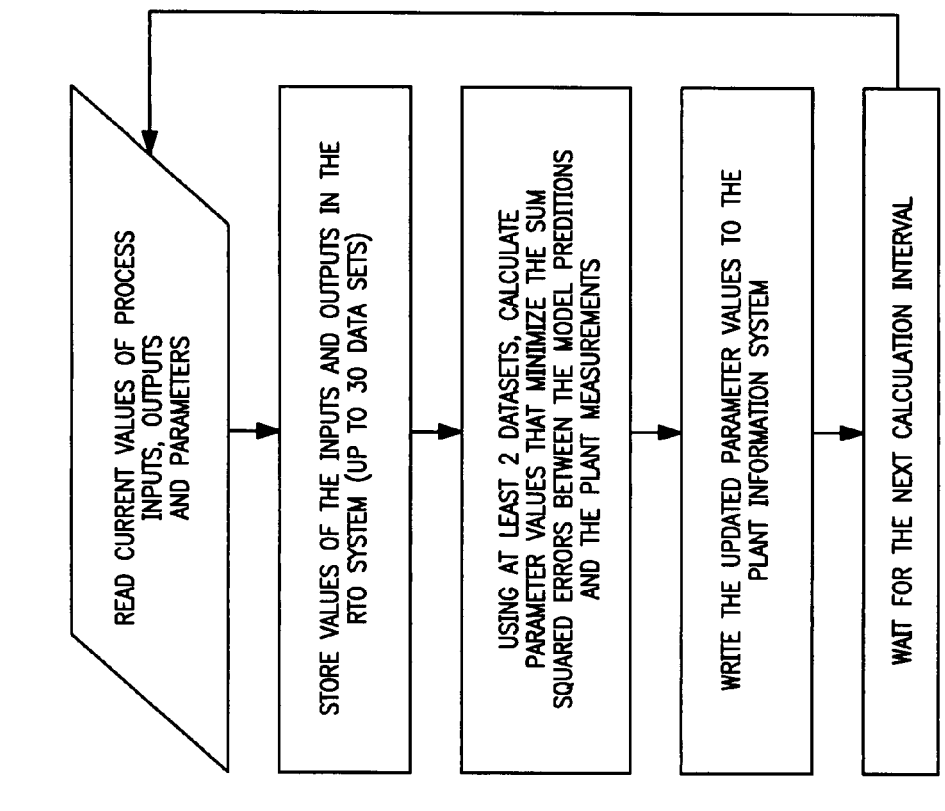
FIG. 5 is a logic diagram of the programming utilized to determine corrected process models for calculations of predicted process outputs for use in real time optimization.

With reference to FIG. 5, an adjustable parameter updating process is conducted to update the process model to match current plant conditions and thereby form a corrected process model or more accurately models that can be used by the real time optimization program. It is the feedback mechanism in this overall control system. The steps in this calculation begin with reading the current values for the process inputs and outputs from the plant information system into the real time optimization system 212. For the steam methane reformer model, these inputs and outputs have been discussed above. Also included are the current values of the adjustable parameters that are to be updated. The values of the inputs and outputs in the real time optimization system 212, generally indicated by arrowheads 214 and 216, are stored with a rolling data file that preferably contains up to thirty of such data sets. In this regard, the last thirty values are stored since the updating takes place using multiple sets of data and not just the current values. Using at least the most recent of saved data sets, the parameters in the process models are then adjusted as described above such that the overall model error is minimized. This is accomplished by finding the parameter values that would minimize a weighted sum of squared errors. The values of the updated parameters are then written to a file contained in the plant information system. This process is repeated at predefined interval, preferably five minutes.

The optimization process can then be conducted to actually determine the targets that will be sent to the model predictive controller 206 that will set the flow rates and etc. that will be sent via data 208 to the primary control system 200. The goal of the present invention is to maximize the variable margin, therefore both the cost of raw materials and the revenue from the sale of products are calculated as follows:

Total Cost=$\Sigma F_i * C_i$

Total Sales=$\Sigma P_i * p_i$

Where $F_i$ is the flow of a raw material with associated cost $C_i$ and $P_i$ is the flow of a given product with associated price $p_i$. The cost and prices in these expressions can either be a fixed value, a function of the flow of the given material, a function of an index value (such as the cost of natural gas) or any combination thereof. In this regard, the economic model for an index value might be a look-up table incorporated into the program. Also it is possible to include a product purchased from a third party, for example, hydrogen. Again, the saleable products are hydrogen and the export steam.

In the optimization process, there are inputs and constraints to the process that must be met for both operational and contract purposes. For example the natural gas composition of natural gas stream 10 and natural gas fuel stream 60 are process inputs that will not be adjusted. The pressure of export steam stream 38, the pressure of hydrogen product stream 56 are constraints. In addition, the flow rate of the hydrogen product stream must at least be equal to current customer demand, another constraint. The temperature of flue gas stream 32 at its discharge from steam methane reformer 30 and the temperature of the mixed feed gas stream 25 must be above a minimum temperature, yet further constraints. The amount of excess oxygen in the flue gas stream 64 and the natural gas flow of natural gas stream 10 and natural gas stream 60 must be above minimum values, also constraints.

The process inputs and outputs, economic costs and sales prices and constraints are optimized in accordance with the logic flow shown in FIG. 7. Under this flow, current values for the process inputs, targets for the process parameters, known in the art as the optimization variables, process constraints, and updated parameters are recorded. The process inputs, updated parameter values, and current values of the optimization variables are introduced into the process models that are run to calculate the predictions of the constraint values. A "bias" is applied to each of the constraints. This value is defined as the "prediction"-"measurement". These biases account for plant/model mismatch in the optimization process. The bias are applied to the calculated values derived from the process models in an additive fashion so that the constraints are met. The values of the optimization are then calculated using the process models that minimize the total objective function limited by the given limits on the biased constraints. The objective function is defined as the (negative) variable margin for the facility. Practically, in real time optimization, this takes place by moving each variable in turn and determining the effect on the other variables. This is done until a maximum in the variable margin is computed. At this point, the final values of the optimization variables, namely, the targets for the process parameters, for example, the steam to carbon ratio, are written into the plant information system and used as targets by model predictive controller 206. The model predictive controller 206 then sets the flow rates of natural gas and steam that are written to the individual controllers to be implemented on the plant. This flow or process is repeated at a predefined interval, preferably, every five minutes.

While the present invention has been described with reference to a preferred embodiment, as will occur to those skilled in the art, numerous addition, omissions can be made without departing from the spirit and scope of the present invention as defined in the presently appended claims.

We claim:

1. A method of controlling the operation of a plant that produces products including a hydrogen containing product and export steam through processes, including steam methane reforming and indirect heat exchange, to optimize production of products produced by the plant in response to a variable demand, said method comprising:

the steam methane reforming being conducted within a steam methane reformer to produce a synthesis gas containing hydrogen, the indirect heat exchange being conducted within heat exchangers to produce steam to be consumed in the steam methane reformer and the export steam made up of steam not consumed by the steam methane reformer and the hydrogen containing product being the synthesis gas or the hydrogen produced by the plant;

determining predicted current production rates of the products and predicted consumption rates of raw materials used in the production of the products, the raw materials comprising a hydrocarbon containing stream and water used in production of the hydrogen containing product and the export steam;

the predicted current production rates and the consumption rates being determined with the use of models that include semi-empirical process models comprising a steam methane reformer model and heat exchanger models operating on the basis of mass balances, energy balances and pressure balances and including adjustable modeling parameters that influence the predicted current production rates and the predicted consumption rates;

the steam methane reformer model having a process side and a furnace side the process side incorporating a chemical process model of the the steam methane reforming to model production of the synthesis as stream, the steam methane reforming comprising chemical reactions occurring within the steam methane reformer including an endothermic reaction of the steam and hydrocarbons composed apart of the hydrocarbon containing stream and the furnace side modeling production of a heated flue gas and heat to support the endothermic reaction by combustion of an air stream and a fuel composed at least in part of a remaining part of the hydrocarbon containing stream that is modeled on the basis of a completion of the reaction between the air stream and the fuel and without an assumed pressure drop;

the mass balances for the chemical process model being a function of the mass balances of chemical species taking part in the steam methane reforming and being based upon an extent of reaction of the chemical reactions occurring within the steam methane reformer and at least one equilibrium expression derived from an outlet pressure of the steam methane reformer and at least one equilibrium constant that is in turn a function the difference between the outlet temperature and an approach to at least one equilibrium temperature and the adjustable modeling parameters comprising the approach to the at least one equilibrium temperature, and an assumed pressure drop within the steam methane reformer, an assumed loss of the heat from the steam methane reformer and heat transfer coefficients between the process side and the furnace side of the steam methane reformer model and within the heat exchangers;

the heat exchanger models modeling heat exchanger operations between the heated flue gas and the synthesis gas;

determining errors between the predicted current production rates and actual current production rates and applying said errors to the semi-empirical process models by adjusting the adjustable modeling parameters such that the predicted and actual current production rates are about equal and therefore, the semi-empirical process models are corrected semi-empirical process models;

optimizing production of the products through real time optimization utilizing the corrected semi-empirical process models to yield targets for process parameters that at least influence the production of the products and the consumption rates of the raw materials and that include a steam to carbon ratio of the steam methane reforming, synthesis gas temperature of the synthesis gas and combustion air flow of the air, the optimization being conducted on a basis of cost of the raw materials and selling price of the products and the production being optimized such that the variable demand is met and such that a variable margin gained upon sale of the products is maximized; and controlling the processes conducted within the plant in accordance with the targets.

2. The method of claim 1, wherein the hydrogen containing product constitutes the synthesis gas.

3. The method of claim 1, wherein:

the hydrogen containing product is a purified hydrogen stream produced by subjecting the synthesis gas stream to a water gas shift reaction to produce a shifted stream and a pressure swing adsorption process to produce the purified hydrogen stream and a waste fuel stream;

the fuel is also composed of the waste fuel stream;

the chemical process model employed in the process side of the steam methane reformer model is one of two chemical process models;

the other of the two chemical process models is a water gas shift reactor model to model the production of the shifted stream through reaction of carbon monoxide and water contained in the synthesis gas stream;

the models also include a splitter model of the pressure swing adsorption process utilizing a percentile of hydrogen separation from the shifted stream, the percentile varying with the flow rate of the shifted stream;

the assumed heat losses of the adjustable process parameters also include a loss of heat from the water gas shift reactor; and the heat exchanger models also model the indirect heat exchange within a feed gas heater and a feed water heater between the hydrocarbon containing stream and the water, respectively, and the shifted gas stream.

* * * * *